US012768317B1

(12) United States Patent
Fluhler

(10) Patent No.: US 12,768,317 B1
(45) Date of Patent: Oct. 20, 2026

(54) ROCKET ENGINE ENHANCEMENT

(71) Applicant: Herbert U. Fluhler, Huntsville, AL (US)

(72) Inventor: Herbert U. Fluhler, Huntsville, AL (US)

( * ) Notice: Subject to any disclaimer, the term of this patent is extended or adjusted under 35 U.S.C. 154(b) by 94 days.

(21) Appl. No.: 17/167,586

(22) Filed: Feb. 4, 2021

Related U.S. Application Data

(60) Provisional application No. 62/970,162, filed on Feb. 4, 2020.

(51) Int. Cl.
*F02K 9/82* (2006.01)
*F02K 9/88* (2006.01)

(52) U.S. Cl.
CPC . *F02K 9/82* (2013.01); *F02K 9/88* (2013.01)

(58) Field of Classification Search
CPC ..... F02K 9/80; F02K 9/82; F02K 9/88; F02K 9/972
See application file for complete search history.

(56) References Cited

U.S. PATENT DOCUMENTS

| | | | | | |
|---|---|---|---|---|---|
| 4,947,644 | A * | 8/1990 | Hermant | F02K 1/30 | 239/265.17 |
| 5,067,316 | A * | 11/1991 | Bonniot | F02K 9/82 | 239/265.23 |
| 6,983,587 | B2 * | 1/2006 | Shumate | F02K 9/97 | 60/204 |
| 8,408,497 | B2 * | 4/2013 | Boelitz | B64G 1/002 | 244/158.9 |
| 2004/0079072 | A1 * | 4/2004 | Shumate | F02K 9/97 | 60/204 |
| 2008/0134667 | A1 * | 6/2008 | Pavia | F02K 9/974 | 60/267 |
| 2009/0235639 | A1 * | 9/2009 | Kimura | F02K 9/58 | 60/246 |
| 2010/0326043 | A1 * | 12/2010 | Pelfrey | F02K 9/972 | 60/205 |
| 2015/0354503 | A1 * | 12/2015 | Vuillamy | F02K 9/52 | 60/264 |

FOREIGN PATENT DOCUMENTS

DE 4115720 A1 * 11/1992 ............... F02K 9/82

OTHER PUBLICATIONS

NASA, Inside The J-2X Doghouse: The Gas-Generator Cycle Engine, Dec. 15, 2010, NASA (Year: 2010).*

* cited by examiner

*Primary Examiner* — Kyle Robert Thomas
(74) *Attorney, Agent, or Firm* — Patent Grove AB; Tomas Friend

(57) ABSTRACT

A thrust augmentation system for infinitely variable altitude compensation in solid and liquid fueled rocket engines increases thrust and maximum net total impulse. An Aero Ring rocket engine positioned at a point/ring in the nozzle where flow separation is expected and provides additional mass flow, heat, and pressure to fill the vacuum interior to the nozzle edge where atmospheric intrusion can produce damaging plume flow instabilities. Throttling the Aero Ring engine during ascent allows the effective area expansion ratio to optimally match that needed at each altitude during ascent, thereby providing maximum thrust and impulse throughout the flight. Subdividing the Aero Ring engine into annular segments and controlling them individually or in groups can provide thrust vector control steering.

14 Claims, 2 Drawing Sheets

ROCKET ENGINE ENHANCEMENT

CROSS REFERENCE TO RELATED APPLICATIONS

This application claims priority to U.S. provisional application 62/970,162 filed Feb. 4, 2020, which is incorporated by reference.

STATEMENT REGARDING FEDERALLY FUNDED DEVELOPMENT

This invention was made without Federal or State government support.

FIELD OF THE INVENTION

The field of the invention relates to thrust augmentation enhancement and altitude compensation for rocket engines.

BACKGROUND OF THE INVENTION

One limitation common to all types of rockets concerns altitude related degradation caused by a lack of altitude compensation. Altitude compensation refers to compensating the rocket engine for operating at an altitude different from the altitude for which the rocket was designed to operate optimally. As a rocket engine transits all altitudes from lower altitude (e.g. near sea level) to space, local atmospheric pressure decreases. This degrades rocket engine performance if the engine is not specifically designed to accommodate the changing atmospheric pressure via its area expansion ratio. Altitude degradation has been, and continues to be, a bane to all rocket engine designs, robbing them from achieving their highest potential performance in both thrust and total impulse delivered to the payload.

Altitude degradation derives from atmospheric effects on the rocket nozzle exhaust and its impact on thrust and total impulse performance. As the exhaust effluent passes through the throat of the rocket engine, its velocity accelerates to sonic speed in the throat, producing what is referred to as choked flow. The effluent then accelerates to supersonic speed as it transits past the throat and down the nozzle due to the nozzle's progressively increasing area at each progressive down stream axial station. As the area becomes larger, the gas expands to fill that additional nozzle area which, in turn, increases the axial speed while simultaneously decreasing the local pressure in the effluent at that axial station. This process continues until the end of the nozzle, resulting in a final nozzle exit pressure (Pe).

The majority of thrust from a typical rocket engine comes from the rapid momentum change imparted to the exhaust gas propellant but a smaller, non-trivial amount of thrust comes from the a differential between Pe and the pressure of the surrounding atmosphere (Pa), at least at lower altitudes. Until the rocket reaches space, the Pa presses downward against the top of the nozzle shell, while the exit effluent pressure presses upwards against the inside of the nozzle shell. At lower altitude, highest thrust and best performance is achieved when Pe is about the same as Pa, or about 15 PSI at sea level. Under these conditions, there is no net static pressure force applied to the nozzle, no undesired pressure driven extraneous flows occur, and the highest possible momentum transfer to the exhaust (and hence thrust) is achieved.

A rocket engine provides near maximum thrust and maximum impulse performance when the nozzle is optimally expanded, i.e. when Pe=Pa. A nozzle is said to be over expanded for a particular altitude when Pe<Pa because the nozzle is larger than the size of the exhaust plume. Similarly, when Pe>Pa at a given altitude, the nozzle is said to be under expanded because a larger nozzle would provide a closer match between Pe and Pa.

An optimally expanded nozzle at a given altitude and Pa is only optimal at the specific altitude/Pa for which it is designed to be optimal. Consequently, the rocket engine produces suboptimal performance over the majority of its ascent. Rockets spend most of their ascent trajectory and burn time in the upper atmosphere so most ground launched rocket engines have a nozzle that is slightly over expanded at lower altitudes. Because Pe<Pa, Pa presses the effluent together such that the effluent stream is narrower than the exit diameter of the nozzle. This leads to an annularly shaped region of relative vacuum just inside of the edge of the nozzle exit and inward atmospheric air flow around the perimeter of an annulus inside the nozzle exit. This means that a net atmospheric pressure presses down over this outer perimeter annulus area with no compensating upward force, resulting in a direct thrust loss at launch when thrust is most needed. Early separation of the effluent flow from the nozzle wall may occur near the nozzle exit, leading to irregular flows, oscillations, and instabilities in the effluent flow, which may result complicate rocket control or even damage the rocket engine. Over expansion is less of a problem at high altitudes because Pe and Pa are both lower, making all forces smaller. Both over expansion and under expansion for a given altitude and pressure lead to wasted potential thrust and impulse performance at high altitudes.

One consequence of lower thrust at lower altitude is a gravity drag penalty in total impulse lost by a slower acceleration of the vehicle. Greater thrust at launch allows lifting of heavier payloads and reduces rocket burn time to achieve orbit velocity, which may reduce the amount of propellant needed for a given mission.

U.S. Pat. No. 6,213,431 B1 and US 2013/0298523 A1 describe an aerospike rocket engine with an inverted geometry that automatically adapts to different atmospheric pressures and is considered to be an atmospheric compensated engine. The complexity, weight, and cost of the engine, however, have thus far prevented its use in an orbital lift vehicle.

U.S. Pat. No. 6,591,603 B2 describes a self-compensating rocket engine having a nozzle plug that deflects combustion products from the combustion chamber to compensate for changes in ambient backpressure at the nozzle exit cone. Disadvantages of this self-compensating rocket engine include technical difficulties associated with cooling the deflector, which is in the hottest part of the plume, and cooling nozzle liner where it is impacted by the deflected hot gases.

Some solutions for altitude compensation involve a gas, a rapidly evaporable fluid, or a burnable propellent or bi-propellant injected about a circumferential ring located at an axial station between the throat and the nozzle exit, usually near the flow separation point/ring. This fills in the void otherwise created between the plume and nozzle inside wall below the flow separation point/ring. U.S. Pat. No. 6,568,171 B2 describes augmenting the thrust by injecting liquid propellant into the divergent section of the nozzle to cause secondary combustion in an annular region of the interior of the divergent section of the nozzle. The secondary combustion forms a secondary combustion gas that maintains a wall pressure that is equal to or greater than Pa WO 2008/129372 A2 describes a rocket engine in which a ring slot formed at the junction of two expansion sections extends circumferentially around the nozzle axis. Gas discharge ducts of a gas injection device are connected to the ring slot for injection of gas into the expansion zone. A wall in the ring slot has through holes to allow fluid communication between the expansion zone and the outside of the nozzle. US 2007/0012820 A1 describes a circular gas injector attached to a propulsion nozzle to force an even separation of gas from the nozzle wall at a point where the jet pressure is nearly equal to sea-level Pa. A dual bell nozzle may be used, which contains an inflection point that forces even separation at near sea-level Pa. The F-1 engine of the Saturn-V rocket injected turbine exhaust into the nozzle in an evolute about the top of the skirt to provide additional thrust.

Despite many proposed solutions for altitude compensation, the aforementioned solutions do not provide for retrofitting of an existing rocket engine to be continuously compensated with altitude and existing automatically self-compensating solutions do not provide higher total thrust at launch and higher total impulse and ISP without complexities and costs that prevent their use.

BRIEF SUMMARY OF THE INVENTION

Embodiments of the present invention preferably seek to mitigate, alleviate or eliminate one or more deficiencies, disadvantages or issues in the art, such as the above identified, singly or in any combination, by providing for a rocket engine comprising dynamically variable altitude compensation. The present invention also provides for a kit and a method for retrofitting an existing rocket engine to comprise dynamically variable altitude compensation. The invention additionally provides for a method for operating a rocket engine to provide dynamically variable altitude compensation.

The invention employs a substantially highly expanded or maximally expanded nozzle designed to operate near the highest altitude of operation and enables this highly over expanded nozzle to operate safely and optimally at lower altitude. An Aero Ring Thrust Augmentation System (TAS) is added about the inside circumference of the nozzle near where the flow separation point/ring would occur. The Aero Ring TAS uses the rocket engine plume as an effluent constraining boundary. The Aero Ring is disposed axially at or near to where flow separation point/ring would occur in a corresponding conventional rocket engine nozzle. The effluent from the Aero Ring engine neutralizes any vacuum or negative pressure that may infiltrate around the nozzle exit edges of the nozzle and prevents instabilities in the central plume flow. Additionally, the Aero Ring exhaust effluent increases the pressure in an annulus about the rocket nozzle perimeter to provide more thrust than introduction of gas, liquid, or propellants into the nozzle. The plume from the Aero Ring may be designed to substantially match or boost the velocity of the central plume to minimize or eliminate impulse reduction. This combination adds a substantial static pressure thrust as well as a substantial dynamic pressure (momentum) thrust at launch. Once the rocket has ascended a suitable altitude, the Aero Ring TAS may be throttled back to optimally adjust the effective area expansion ratio as higher altitudes are attained and eventually retire with no deleterious impact on the performance of the now highly expanded nozzle suitable for highest altitude performance.

By preferentially thrusting different azimuthal stations in the ring the Aero Ring may additionally or alternatively be used for thrust vector control and/or as a backup engine for the main engine.

BRIEF DESCRIPTION OF THE DRAWINGS

The elements of the drawings are not necessarily to scale relative to each other, usually in order to enhance clarity, with emphasis placed instead upon clearly illustrating the principles of the disclosure. Like reference numerals designate corresponding parts throughout the several views of the drawings in which.

DETAILED DESCRIPTION OF THE INVENTION

Figure 1:
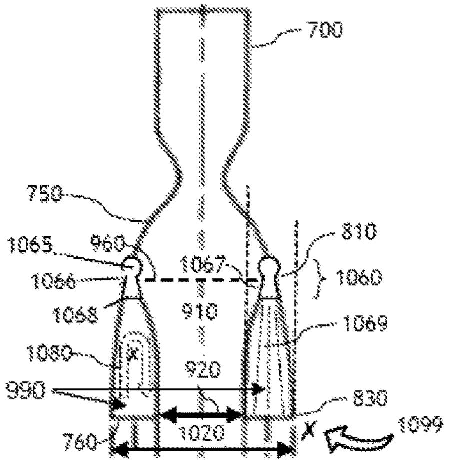
FIG. 1 is a cross section view of a first embodiment of a rocket engine comprising an Aero Ring TAS.

FIG. 1 illustrates a first embodiment of a rocket engine comprising an Aero Ring Thrust Augmentation System (ARTAS), or an "aero ring" (AR) rocket engine. The aero ring engine 1060 is integrated into the nozzle 750 proximate to where flow separation along a separation ring/point 960 may occur. The aero ring engine comprises a ring combustion chamber 1065, a ring nozzle throat 1066, and a ring nozzle 1067 terminating in a ring nozzle exit 1068 which exhausts a ring curtain plume 1069 into void 990 between the outer edge of the main engine plume 910 and the inside wall of the main engine nozzle 750. The aero ring engine can change the flow separation point/ring as long as the axial location of the aero ring nozzle 1067 is above the flow separation point/ring.

By providing an additional high velocity and high pressure exhaust effluent 1069, the aero ring prevents intrusion of exterior atmosphere 1099 from entering around the nozzle edge 760. This inhibits oscillatory or diverting flows 1080 from causing damaging oscillations or flow instabilities. The aero ring engine exhaust plume 1069 fills in the void 990 and also expands the net exit plume from the rocket from an exit diameter of 920 (at low altitude) to a much wider plume, optimally filling the whole nozzle exit 1020. This provides a significant static pressure derived thrust increase as well as a dynamic pressure (momentum based) thrust increase. Furthermore, since the void 990 is now filled, the nozzle area expansion ratio may be increased, resulting in further static pressure thrust increase, as well as higher altitude performance enhancement. Because the aero ring engine effluent is high velocity, high pressure and high temperature, it does not rob temperature, velocity, or pressure from the central, main engine plume 910, and may be designed to recharge the plume (add more energy) with a higher velocity, temperature and pressure. This may require a larger nozzle to extract all the energy.

Summarizing, the technological effects of aero ring engine include: replacing the annular vacuum void around the inside perimeter of the nozzle with increased static pressure, increasing the total plume area beyond the area of the annular vacuum void, increasing total mass flow rate and associated additional propellant momentum change, allowing for use of a larger area expansion ratio nozzle (e.g. greater than 16:1) at low altitudes for increased lower altitude thrust, decreasing gravity drag, and throttling ability to achieve near optimum area expansion ratio at all altitudes.

Figure 2:
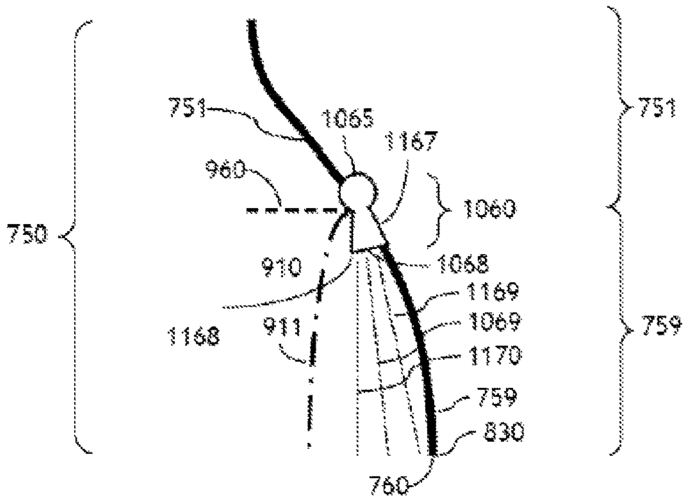
FIG. 2 is an enlarged cross section view of a second embodiment a rocket engine comprising an Aero Ring TAS.

FIG. 2 illustrates integration of another embodiment of the aero ring engine with the forward portion 751 of the nozzle 750 and the aft portion 759 of the nozzle 750 using the aero ring engine as a delineator. The forward portion 751 of the nozzle is normally regeneratively cooled in high performance liquid fueled rockets but may, additionally or alternatively, be film cooled, ablatively cooled and, uncooled. For solid rocket engines, cooling is typically ablative. The aft portion 759 of the nozzle may also be regeneratively cooled and/or film cooled, but more commonly is uncooled or radiatively cooled or may be cool gas cooled.

It is generally undesirable for protrusions to extend into the nozzle flow of a rocket engine as this can cause performance degradations, flow instabilities and over-heating of what is protruded into the main flow plume 910. The exhaust plume of the aero ring engine shown in FIG. 2 is canted to be substantially tangent to the main central engine plume 910, particularly at the plume's outer edge 911. The aero ring engine 1060 most preferably canted inward as shown in FIG. 2 to a degree such that the inward edge of the aero ring plume 1170 is substantially tangent to the outer edge 911 of the main plume 910. The precise optimum degree of canting for a particular main engine/aero ring engine combination is preferably chosen using computational fluid dynamics modeling and simulation. Additionally, the aero ring engine 1060 is so configured and canted such that the outward edge of its plume 1169 is substantially tangent to the inner surface of the aft portion 759 of the nozzle 750. This configuration allows the plume of the aero ring engine 1060 to substantially fill the void 990.

Also as shown in FIG. 2, the outer side 1067 of the aero ring nozzle 1067 is integrated to be substantially parallel to nozzle 750 at which point it is mounted and the inner side of ring nozzle is made substantially parallel to the main central engine plume outer edge 911. This arrangement, or close approximations thereto, minimize shear between the two plumes while filling void 990. The inside corner and edge 1168 of the aero ring nozzle 1067 may be reduced or substantially removed so that the nozzle 1067 becomes conformal to the central main engine nozzle 750, optionally integrated thereto.

A further feature of the aero ring nozzle is the introduction of additional fuel as coolant, or other coolant, injected into outer edge 1169 of the aero ring plume 1069 from either the outer edge of the combustion chamber 1065, or the outer edge of the throat 1066, or the outer edge of the nozzle 1167 or nozzle exit 1068. This additional fuel or coolant provides film cooling to the inside surface of the aft portion of the main nozzle 750 and protects it from the heat of both the main central engine plume 910 and the aero ring plume 1069. If fuel is used as coolant, it provides a fuel rich film incapable of burning without oxygen. This cooling may eliminate the need for active regenerative cooling of the aft nozzle section 759 reducing weight, complexity and cost.

Also with reference to FIG. 2, the optional introduction of additional oxidizer into the inner edge 1170 of the aero ring plume 1069 from the inner edge of the combustion chamber 1065, the inner edge of the throat 1066, the inner edge of the nozzle near 1168, or combinations of these. This additional oxidizer may help cool the aero ring engine and may provide after burning in the main plume 910 to add additional heat to the expansion in the nozzle 750. Most rocket engines use a substantially fuel rich propellant mixing ratio, either directly for combustion, of for film cooling of the combustion chamber and the forward section 751 of the nozzle 750. This makes central main engine plume 910 fuel rich and, by introducing excess oxygen into the inner plume edge 1170, this fuel may be burned to provide additional heat, expansion and thrust to the engine. The oxygen rich plume edge 1170 may also mix with some of the fuel rich plume edge 1169 to provide addition burning near the center of the aero ring plume 1069, providing further heat to the plume while still providing a standoff from the inner aft nozzle wall 759. In this sense then the invention provides a substantial after burner feature to significantly increase thrust.

Figure 3:
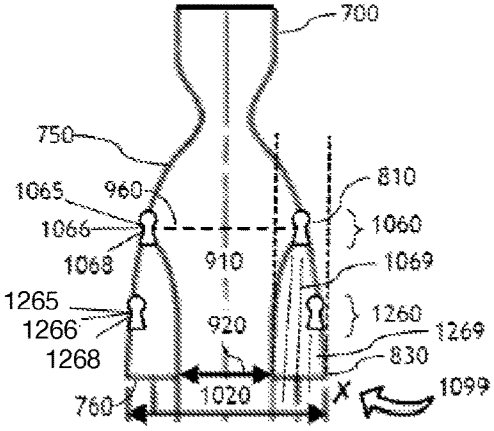
FIG. 3 is a cross section view of a third embodiment of a rocket engine comprising an Aero Ring TAS.

FIG. 3 illustrates an embodiment of a rocket engine comprising more than one aero ring engine 1060 in the main central engine nozzle 750. A second aero ring engine 1260 may be disposed axially along the nozzle and need not be of the same size or capability as a first aero ring engine 1060. It may be desirable to provide smaller aero ring engines and nozzles which are easier to integrate into the nozzle and producing less impingement into the main plume flow, and helping to provide more uniform and consistent film cooling along the inner surface of the aft portion 759 of the main engine nozzle 750. Film cooling has a finite length after which the film has absorbed heat and the film cooling becomes less effective. An advantage of additional aero ring engine(s) downstream of the first is the ability to provide fresh film cooling further downstream. The exact number and spacing of aero ring engines may be varied depending on the specifications of the main engine and the operation performance desired.

Figure 4:
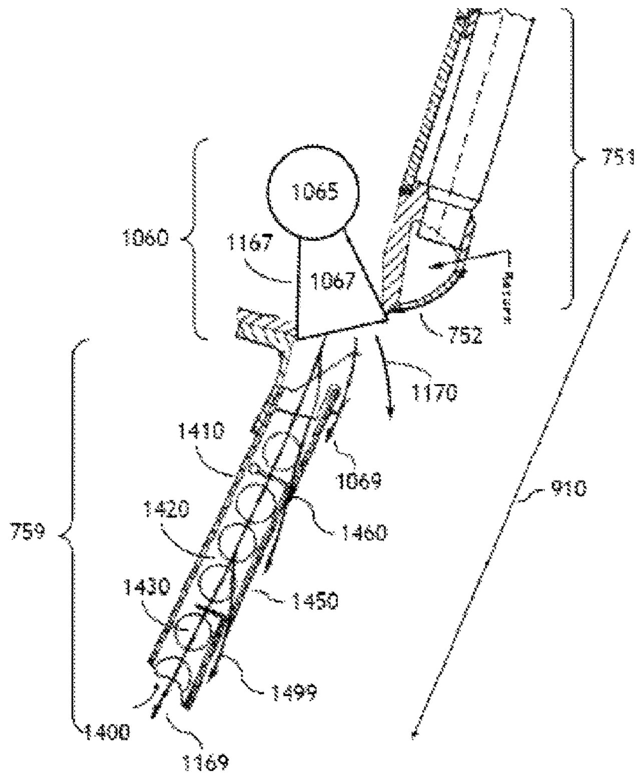
FIG. 4 is an enlarged cross section view of a fourth embodiment of a rocket engine comprising an Aero Ring TAS that may replace the turbine exhaust cooling manifold in FIG. 1.

FIG. 4 in a close up cross section view of an embodiment of the invention in which the aft nozzle portion 759 of the main engine nozzle 750 comprises a cooling plenum 1400, similar to the plenum used with the Saturn F-1 engine. The cooling plenum 1400 comprises an outer closed shell 1410 supported by conically angled and axially aligned stringers 1420 with cutouts 1430 to lighten the aft nozzle portion 759 and to provide azimuthal cross flow pressure equalization. The inner surface of the aft nozzle portion 759 comprises a plurality of short (in axial length) and stacked (axially disposed) thin conic sections 1450 providing circumferential gaps 1460 between them through which cooler exhaust effluent 1169 from the aero ring engine may flow from within the plenum to the inside surfaces of the conic sections 1450 to create a cooling film 1499 protecting sections 1450 from the hotter primary 910 and secondary 1069, 1170 plumes. The conic sections 1450 may be angled slightly differently from the local tangent to the aft nozzle portion 759 in order to provide a radial offset to the gaps 1460 that extends slightly into the plenum 1400 to "scrap" a thin layer of the flow 1169 and divert it inward for the making the cooling film 1499.

Additionally or alternatively, the nozzle 750 may comprise an offset in diameters between the axial end of the forward nozzle section 751 and the axial beginning of the aft nozzle section 759, giving rise to a step or ridge 752 that can serve to hold the flow separation point/ring 960 at a desired axial station. The step or ridge 752 can also provide a means to control and discretize the location of the flow separation point/ring during ascent both singularly as shown, as well as by inclusion of additional steps/ridges at different axial stations along the aft nozzle section 759.

The outer edge of the aero ring engine is burned rich or includes fuel or coolant injection near injection area 1167 within the combustion chamber 1065, the throat 1066, the nozzle 1067, or the nozzle exit 1068 of the aero ring engine, depending on the specific application and design. The cooler effluent 1169 predominantly enters the enclosed shell plenum 1400, which is constructed within the aft nozzle section 759 of the main engine.

While it is possible to configure the aero ring engine so as to produce as much or more thrust than the unmodified central main engine 700, the primary benefit of the invention is to provide thrust augmentation at low altitudes and to increase the total impulse of the engine. Achieving that objective does not require an extremely high performance aero ring engine as would be required to provide more thrust. This is an advantage of the aero ring engine compared to an Aero Spike engine because it does not require the complexity of an Aero Spike engine, which is designed to provide main thrust.

Figure 5:
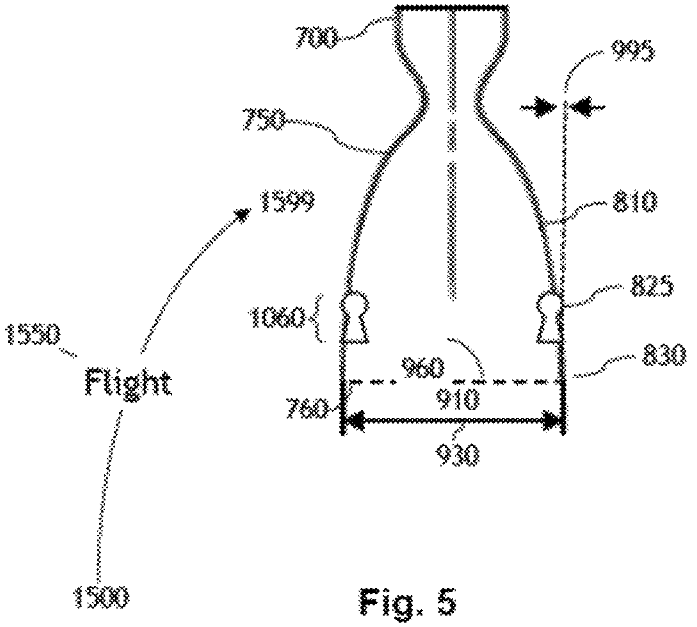
FIG. 5 is a cross section view illustrating the operation of an exemplary embodiment of a rocket engine comprising an Aero Ring TAS.

FIG. 5 illustrates how an embodiment of the invention operates in use. The rocket begins operation at low level (nominally sea level) launch 1500, with the aero ring engine 1060 firing in conjunction with the main central engine 700. The main central engine produces a coaxial concentric plume 910 at the core of the nozzle with a nominal flow separation point/ring 960. The aero ring engine injection of extra flow via plume 1069, with temperature and pressure at a station near where the flow separation point/ring 960 occurs fills the void 990 to prevent the intrusion of local atmospheric air 1099 into the void 990. The aero ring engine's annular exhaust plume 1069, combined with the central main engine's columnar plume 910, enlarges the plume's nominal sea level exit diameter (without aero ring engine) from 920 to fully across the over expanded nozzle's exit diameter 930. This prevents flow instabilities and increases sea level thrust by a factor of 2 or more over an unmodified engine (i.e. area expansion ratio for sea level operation and no aero ring engine).

During flight 1550, the aero ring engine is throttled back in proportion to the local atmospheric pressure at each altitude attained, for example using input from a pressure sensor altimeter, or GPS receiver. Consequently, the aero ring annular plume 1069 becomes less as the rocket ascends. This is done in a coordinated way so that the central plume 910 expands in direct proportion to the amount the annular plume 1069 decreases so that the nozzle is always filled with a substantially uniform plume to prevent ingress of ambient atmospheric air and augmenting thrust. This continues until the maximum planned altitude is achieved at 1599 where all thrust is terminated.

Before complete thrust termination at 1599, the aero ring engine has throttled back to zero or a minimal operational thrust with no annular plume emanating from the Aero Ring engine at 1599 and the central main engine plume filling the nozzle, which is optimally expanded for operation at the maximum altitude 1599. In this way near optimum altitude compensation is achieved, resulting in maximum achievable total impulse, maximization of thrust for a higher payload mass, and minimization of gravity drag effects.

Figure 6:
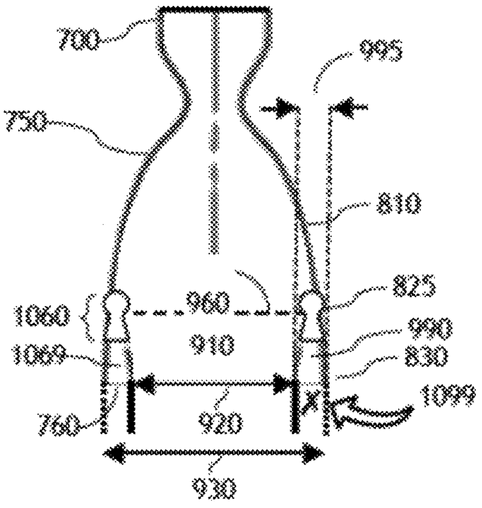
FIG. 6 is a top cross sectional view of the segmentation of one embodiment of a rocket engine comprising an Aero Ring TAS.
Figure 6:
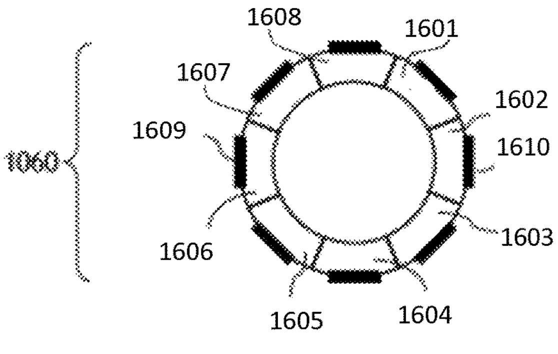

FIG. 6 is a top cross sectional view of an embodiment of the invention including the feature of thrust vector control steering. Although the aero ring engine may comprise a singular annular extrusion, such a construction may be expensive. The aero ring engine may advantageously be constructed of subassemblies to simplify manufacturing. Such an aero ring engine may comprise a plurality of annular thruster sections, each with individually controllable and metered propellant and/or cooling injectors which service the annular section. The exemplary embodiment shown in FIG. 6 comprises eight annular thruster sections 1601-1608, each of which may be strictly straight or curved to provide best match to the nozzle 750 curvature. Each annular thrust section 1601-1608 further comprises a propellant valving and control sub assembly 1610, which can control the gas exhaust effluent and thrust from the assigned annular thrust section. Although each annular thrust section is shown with its own valving and control sub assembly, this assembly can also be centrally disposed with distribution of propellants via tubes and some combination of centralized and distributed valving and ignition control.

The aero ring engine provides gaseous thrust vector control by either increasing or decreasing the propellant and/or coolant to one or more annular thrust sections 1601-1608. The addition of propellant and/or coolant increases gas volume, heat, and pressure at the azimuthal station of the main engine 700, thereby inducing a local increase in thrust and a consequential upward leverage on that side of the engine. The reduction of propellant and/or coolant decreases the gas volume, heat, and pressure in the azimuthal station of the main engine 700, thereby inducing a local reduction of thrust and a consequential downward leverage on that side of the engine. By selecting and then increasing or decreasing the propellant and/or coolant flow to selected annular thrust segments, thrust vector control of the whole engine is provided without the addition of additional mechanical articulation hardware or associated structural support hardware.

Although a concentric, rotationally symmetric embodiment has been described, it should be apparent to those skilled in the art of rocket engine design that other geometries of the invention are also possible. For example, the aero ring engine TAS augmentation to a circular nozzle rocket may be configured as an aero line engine within a linear nozzle engine having a bell nozzle contour in one shorter cross section dimension, and then an extrusion of same in an orthogonal longer linear/line dimension. Other geometries are possible which may serve to address more specific cases with the engine component of the invention nested within the main nozzle of the rocket engine.

The invention claimed is:

1. A supplemental rocket engine configured for augmenting the thrust of a main rocket engine producing a main engine thrust, said main rocket engine having a main engine propellant feed system, a main engine combustion chamber, a main engine throat, and a main engine nozzle configured to produce a main engine exhaust plume exiting from the main engine throat through the main engine nozzle, wherein:

the supplemental rocket engine comprises a supplemental engine propellant feed system, a supplemental engine combustion chamber, a supplemental engine nozzle throat, and a supplemental engine nozzle configured to produce a supplemental ring curtain exhaust plume exiting from the supplemental engine throat through the supplemental engine nozzle;

the supplemental engine combustion chamber and the supplemental engine nozzle are separated by the supplemental engine nozzle throat;

the supplemental engine combustion chamber, supplemental engine nozzle throat, and supplemental engine nozzle form a ring configured to be disposed axially at or near to a position in the main engine nozzle where flow separation is expected such that the supplemental ring curtain exhaust plume, in use, flows between the main engine exhaust plume and an inner surface of the main engine nozzle to match or boost a velocity of the said main engine exhaust plume; and the supplemental rocket engine is configured to throttle down as a function of altitude or ambient atmospheric pressure when in use.

2. The supplemental rocket engine of claim 1, wherein the supplemental rocket engine nozzle is configured to direct the supplemental ring curtain exhaust plume parallel to the main engine exhaust plume.

3. The supplemental rocket engine of claim 1, wherein the supplemental ring curtain exhaust plume is canted inward to be tangent to the main engine exhaust plume.

4. The supplemental rocket engine of claim 1, wherein the supplemental rocket engine is configured to introduce fuel into an outer edge of the supplemental ring curtain exhaust plume from an outer edge of the supplemental engine combustion chamber, an outer edge of the supplemental engine throat, an outer edge of the supplemental engine nozzle, or a nozzle exit of the supplemental rocket engine.

5. The supplemental rocket engine of claim 1, wherein the supplemental rocket engine is configured to introduce an oxidizer into an inner edge of the supplemental ring curtain exhaust plume from an inner edge of the supplemental engine combustion chamber, an inner edge of the supplemental engine throat, an inner edge of the supplemental engine nozzle, or a combinations of these.

6. The supplemental rocket engine of claim 1, wherein the supplemental engine nozzle is integrated with a portion of the main engine nozzle.

7. The supplemental rocket engine of claim 1, wherein said supplemental rocket engine comprises a plurality of axially disposed supplemental rocket engine segments, each comprising a supplemental engine combustion chamber and a supplemental engine nozzle separated by a supplemental engine nozzle throat;

the ring is a segmented ring formed by the supplemental rocket engine segments disposed axially at or near to the position in the main engine nozzle where flow separation is expected such that the supplemental ring curtain exhaust plume, in use, flows between the main engine exhaust plume and the inner surface of the main engine nozzle to match or boost the velocity of the said main engine exhaust plume.

8. The supplemental rocket engine of claim 7, wherein the plurality of axially disposed supplemental rocket engine segments are independently throttleable.

9. The supplemental rocket engine of claim 8, wherein the supplemental rocket engine is configured to provide thrust vector control by throttling the plurality of axially disposed annular ring supplemental rocket engine segments differentially in a controlled manner to provide off axis thrust.

10. The supplemental rocket engine of claim 5, comprising a single supplemental engine propellant feed system and a single propellant valving and control sub assembly that controls thrust from each of the supplemental rocket engine segments.

11. The supplemental rocket engine of claim 7, comprising a single supplemental engine propellant feed system and wherein each of the supplemental rocket engine segments comprises a propellant valving and control sub assembly that controls thrust said supplemental rocket engine segment.

12. The supplemental rocket engine of claim 7, wherein each supplemental rocket engine segments comprises a supplemental engine propellant feed system.

13. The supplemental rocket engine of claim 7, wherein said supplemental rocket engine produces a supersonic ring curtain exhaust plume.

14. The supplemental rocket engine of claim 1, wherein said supplemental rocket engine produces a supersonic ring curtain exhaust plume.

* * * * *